(12) United States Patent
Rajeev et al.

(10) Patent No.: US 11,593,325 B2
(45) Date of Patent: Feb. 28, 2023

(54) SYSTEMS AND METHODS OF DATA MIGRATION IN MULTI-LAYER MODEL-DRIVEN APPLICATIONS

(71) Applicant: Tata Consultancy Services Limited, Mumbai (IN)

(72) Inventors: Aswin Rajeev, Pune (IN); Prasenjit Das, Kolkata (IN); Sreedhar Sannareddy Reddy, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 72 days.

(21) Appl. No.: 17/288,472

(22) PCT Filed: Oct. 25, 2019

(86) PCT No.: PCT/IN2019/050790
§ 371 (c)(1),
(2) Date: Apr. 23, 2021

(87) PCT Pub. No.: WO2020/084641
PCT Pub. Date: Apr. 30, 2020

(65) Prior Publication Data
US 2021/0390085 A1 Dec. 16, 2021

(30) Foreign Application Priority Data
Oct. 26, 2018 (IN) .............................. 201821040564

(51) Int. Cl.
*G06F 16/21* (2019.01)
(52) U.S. Cl.
CPC .................. *G06F 16/214* (2019.01)

(58) Field of Classification Search
CPC ........................... G06F 16/214; G06F 16/219
See application file for complete search history.

(56) References Cited

U.S. PATENT DOCUMENTS

| 6,151,608 A | * | 11/2000 | Abrams | G06F 16/214 |
| | | | | 707/999.1 |
| 7,185,016 B1 | * | 2/2007 | Rasmussen | G06F 16/25 |
| 9,792,352 B1 | * | 10/2017 | David | G06F 16/214 |

(Continued)

FOREIGN PATENT DOCUMENTS

CN 102103629 A 6/2011

*Primary Examiner* — Robert W Beausoliel, Jr.
*Assistant Examiner* — Pedro J Santos
(74) *Attorney, Agent, or Firm* — Finnegan, Henderson, Farabow, Garrett & Dunner LLP

(57) ABSTRACT

Systems and methods for data migration in multi-layer model-driven applications is provided. The traditional systems and methods simply provide for comparison based migration approaches, and thus face severe challenges in case of model-driven applications, wherein continuous capturing of transformations in model changes is required. Embodiment of the proposed disclosure provide for a changelog based data migration methodology by modelling, a model-driven application conceptual model; generating, a plurality of optimized data models from the modelling; extracting, from each of the plurality of optimized data models, at least one changelog capturing one or more model changes and transformations in each of the plurality of optimized data models; and executing the data migration using each of an executing changelog.

12 Claims, 5 Drawing Sheets

(56) References Cited

U.S. PATENT DOCUMENTS

| | | |
|---|---|---|
| 2005/0096937 A1 | 5/2005 | Subash et al. |
| 2007/0130180 A1 | 6/2007 | Rasmussen |
| 2008/0301168 A1 | 12/2008 | Adler et al. |
| 2009/0282089 A1 | 11/2009 | Lakshmanachar et al. |
| 2010/0057759 A1 | 3/2010 | Cotichini et al. |
| 2011/0071876 A1 | 3/2011 | Fong et al. |
| 2012/0095957 A1 | 4/2012 | Reddy et al. |
| 2016/0055233 A1 | 2/2016 | Wang et al. |
| 2022/0019640 A1* | 1/2022 | Hermann .................. G06F 8/76 |

* cited by examiner

SYSTEMS AND METHODS OF DATA MIGRATION IN MULTI-LAYER MODEL-DRIVEN APPLICATIONS

PRIORITY CLAIM

The present application is a U.S. National Stage Filing under 35 U.S.C. § 371 and claims priority from International Application No. PCT/IN2019/050790 filed on Oct. 25, 2019, which application claims priority under 35 U.S.C. § 119 from India Application No. 201821040564, filed on Oct. 26, 2018. The entire contents of the aforementioned application are incorporated herein by reference.

TECHNICAL FIELD

This disclosure relates generally to data migration, and, more particularly, to systems and methods of data migration in multi-layer model-driven applications.

BACKGROUND

Data migration comprises moving of data from one environment to another, typically involving some format change or other modification in at least some of the data. Such migration may be performed for a number of reasons. For example, upgrading a database application from an older version to a newer version may also involve changes in the way particular types of data are stored in the database, thus causing a migration to be undertaken. Even if a customer continues to employ a particular version of a database application over a long period of time, a change in operating system, computer system hardware, or other aspect of the computing environment may result in a nontrivial database migration that involves changes in data format and other aspects of the database. Generally, database and other software providers have made available a number of migration tools to address a variety of migration needs and environments.

Data migrations are often complicated and problematic. Depending on the size of datasets, applications involved can be offline for lengthy periods, leading to a loss of productivity, and opportunity cost associated with not having the data set available for important business functions. Migrations typically are manual labor-intensive efforts, and are therefore error-prone, costly and involve redirecting human resources to the migration. Thus, the traditional systems and methods suffer from various technical and non-technical limitations (for example, large volume of data, multiple compatibility requirements, manually specifying each of migration mapping parameters, and high cost etc.) while performing migrations.

SUMMARY

Embodiments of the present disclosure present technological improvements as solutions to one or more of the above-mentioned technical problems recognized by the inventors in conventional systems. For example, in one embodiment, a method of data migration in multi-layer model-driven applications, the method comprising: modelling, by one or more hardware processors, a model-driven application conceptual model comprising a plurality of conceptual model elements, wherein the modelling comprises transforming of the plurality of conceptual model elements from a first version to a second version by a modelling technique; and wherein the model-driven application conceptual model corresponds to one or more multi-layer model-driven applications; generating, based upon the modelling, a plurality of optimized data models corresponding to the one or more multi-layer model-driven applications, wherein each of the plurality of optimized data models are generated by identifying entities, relationships between the entities and attributes from the model-driven application conceptual model; extracting, from each of the plurality of optimized data models, at least one changelog capturing one or more conceptual model changes and transformations in each of the plurality of optimized data models, wherein the changelog is extracted by implementing a modelling enhancement technique on each of the plurality of conceptual model elements; performing, based upon each of an extracted changelog, data migration in the one or more multi-layer model-driven applications, wherein performing the data migration comprises: enabling, by one or more module drivers, a changelog executor for executing each of the extracted changelog, wherein the execution comprises transforming a data from a first model specification to a second model specification; and executing the data migration using each of an executing changelog, wherein the execution comprises an implementation of each modification in each of the plurality of conceptual model elements based upon the transformations in each of the plurality of optimized data models; performing the data migration iteratively using each of the extracted changelog for implementing each of the modification in each of the plurality of conceptual model elements; identifying a plurality of versions between a source application version and a target application version for executing the data migration, wherein the source application version and the target application version correspond to the one or more multi-layer model-driven applications; and identifying a sequence of each of the plurality of versions for executing the data migration in a pre-defined sequence.

In another aspect, there is provided a system of data migration in multi-layer model-driven applications, the system comprising a memory storing instructions; one or more communication interfaces; and one or more hardware processors coupled to the memory via the one or more communication interfaces, wherein the one or more hardware processors are configured by the instructions to: model a model-driven application conceptual model comprising a plurality of conceptual model elements, wherein the modelling comprises transforming of the plurality of conceptual model elements from a first version to a second version by a modelling technique; and wherein the model-driven application conceptual model corresponds to one or more multi-layer model-driven applications; generate, based upon the modelling, a plurality of optimized data models corresponding to the one or more multi-layer model-driven applications, wherein each of the plurality of optimized data models are generated by identifying entities, relationships between the entities and attributes from the model-driven application conceptual model; extract, from each of the plurality of optimized data models, at least one changelog capturing one or more conceptual model changes and transformations in each of the plurality of optimized data models, wherein the changelog is extracted by implementing a modelling enhancement technique on each of the plurality of conceptual model elements; perform, based upon each of an extracted changelog, data migration in the one or more multi-layer model-driven applications, wherein performing the data migration comprises: enable, via one or more module drivers, a changelog executor for executing each of the extracted changelog, wherein the execution comprises transforming a data from a first model specification to a second model specification; and execute the data migration using each of an executing changelog, wherein the execution comprises an implementation of each modification in each of the plurality of conceptual model elements based upon the transformations in each of the plurality of optimized data models; execute the data migration iteratively using each of the extracted changelog for implementing each of the modification in each of the plurality of conceptual model elements; enable the changelog executor by identifying a plurality of versions between a source application version and a target application version for executing the data migration, wherein the source application version and the target application version correspond to the one or more multi-layer model-driven applications; and identify the plurality of versions by identifying a sequence of each of the plurality of versions for executing the data migration in a pre-defined sequence.

In yet another aspect, there is provided one or more non-transitory machine readable information storage mediums comprising one or more instructions which when executed by one or more hardware processors causes the one or more hardware processors to perform a method of data migration in multi-layer model-driven applications, the method comprising: modelling a model-driven application conceptual model comprising a plurality of conceptual model elements, wherein the modelling comprises transforming of the plurality of conceptual model elements from a first version to a second version by a modelling technique; and wherein the model-driven application conceptual model corresponds to one or more multi-layer model-driven applications; generating, based upon the modelling, a plurality of optimized data models corresponding to the one or more multi-layer model-driven applications, wherein each of the plurality of optimized data models are generated by identifying entities, relationships between the entities and attributes from the model-driven application conceptual model; extracting, from each of the plurality of optimized data models, at least one changelog capturing one or more conceptual model changes and transformations in each of the plurality of optimized data models, wherein the changelog is extracted by implementing a modelling enhancement technique on each of the plurality of conceptual model elements; performing, based upon each of an extracted changelog, data migration in the one or more multi-layer model-driven applications, wherein performing the data migration comprises: enabling, by one or more module drivers, a changelog executor for executing each of the extracted changelog, wherein the execution comprises transforming a data from a first model specification to a second model specification; and executing the data migration using each of an executing changelog, wherein the execution comprises an implementation of each modification in each of the plurality of conceptual model elements based upon the transformations in each of the plurality of optimized data models; performing the data migration iteratively using each of the extracted changelog for implementing each of the modification in each of the plurality of conceptual model elements; identifying a plurality of versions between a source application version and a target application version for executing the data migration, wherein the source application version and the target application version correspond to the one or more multi-layer model-driven applications; and identifying a sequence of each of the plurality of versions for executing the data migration in a pre-defined sequence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide systems and methods of data migration for multi-layer model-driven applications. Essentially, a data migration facility provides the ability to relocate" data from one device to another device. A logical relationship is defined between a device (the source) and another device (the target). The logical relationship between a source and target volume provides the framework for a migration. The data migration facility controls multiple concurrent migrations in a single group that is called a session. A migration is the process that causes the data on the source to be copied to the target.

The traditional systems and methods providing for migrations suffer from various limitations, especially in case of data migrations for model-driven applications. For example, in model-driven applications, the models are generally dynamic, which may change from one version of the application to another. This results in considerable changes in the database schema. Also, some data might be stored outside the database, in files and in other storage structures, which may not be properly recorded or migrated. Finally, multiple previous versions of an application may require to be supported for migration to a target version specifications. Manually specifying the migration mapping parameters for each of the combinations may be extremely costly.

The proposed methodology overcomes the limitations faced by the traditional systems and methods. For example, the proposed disclosure provides a set of processes and a system to enable systematic capture of the model changes and changes in data persistence approaches. The proposed disclosure provides for a methodology, which facilitates data migration for complex systems with multiple data persistence units.

Figure 1:
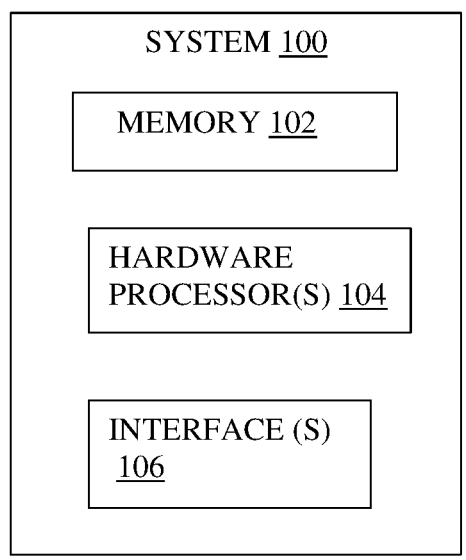
FIG. 1 illustrates an exemplary title system of data migration for multi-layer model-driven applications, in accordance with some embodiments of the present disclosure.
Figure 2A:
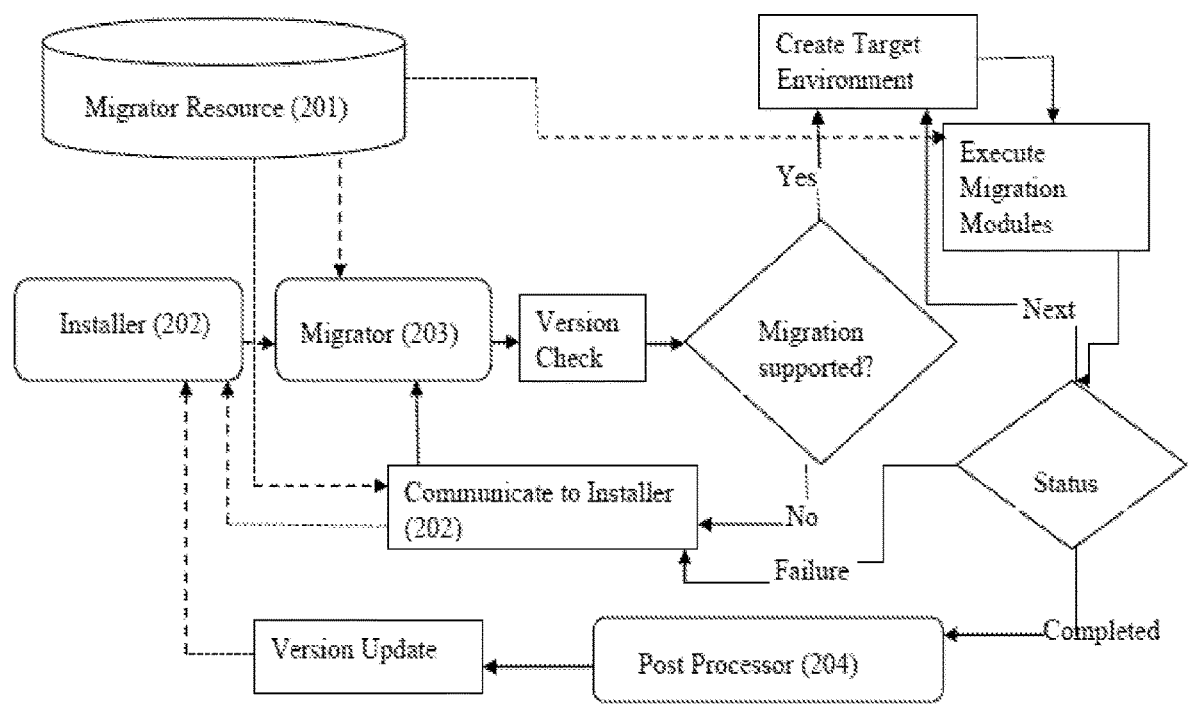
FIG. 2A is an architectural diagram depicting the architecture of a changelog based data migration in the multi-layer model-driven applications, in accordance with some embodiments of the present disclosure.
Figure 2B:
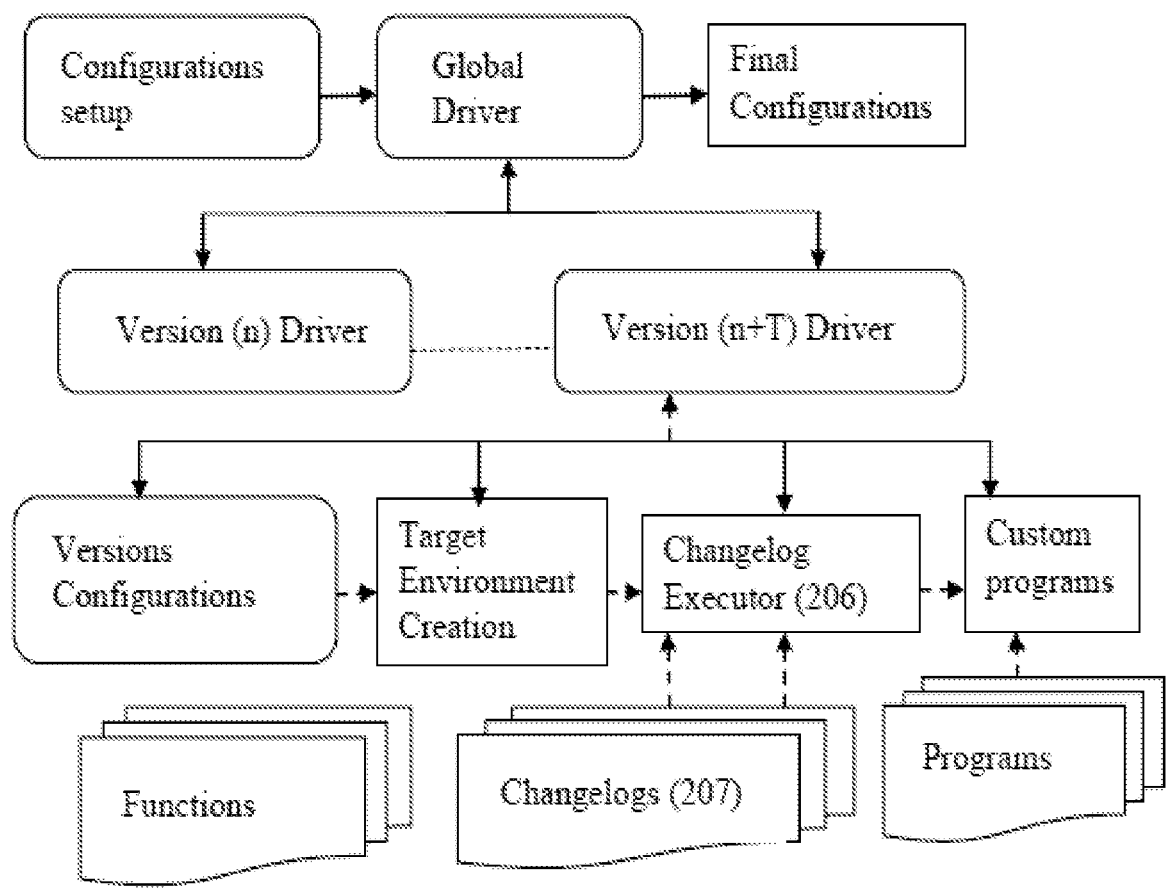
FIG. 2B is an architectural diagram depicting one or more module drivers for enabling a changelog executor, and thus facilitating the changelog based data migration in the multi-layer model-driven applications, in accordance with some embodiments of the present disclosure.
Figure 2C:
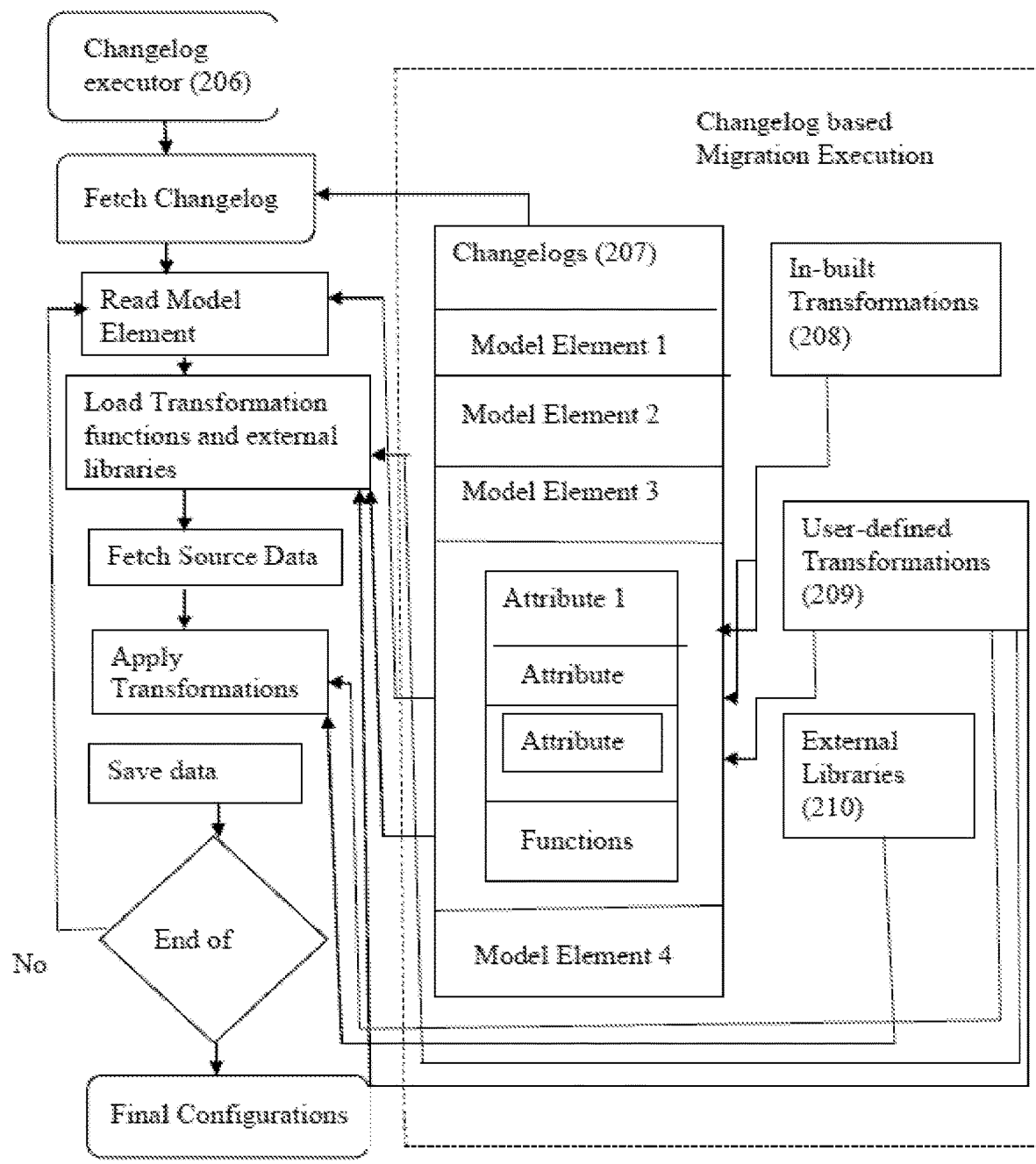
FIG. 2C is an architectural diagram depicting the architecture of the changelog executor facilitating the changelog based data migration in the multi-layer model-driven applications, in accordance with some embodiments of the present disclosure.
Figure 3:
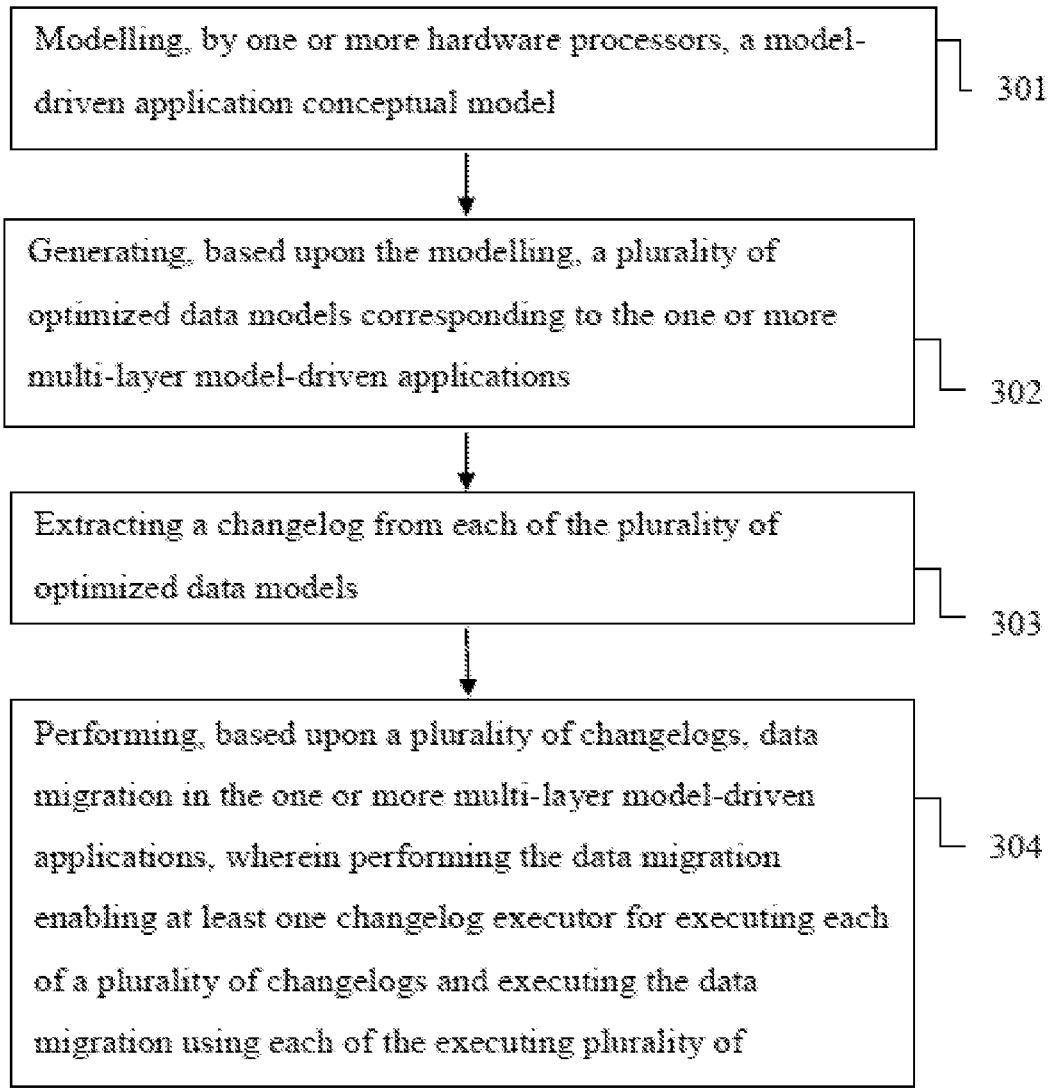
FIG. 3 is a flow diagram illustrating the steps involved in the process of the data migration for the multi-layer model-driven applications, in accordance with some embodiments of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates an exemplary block diagram of a system 100 of data migration in multi-layer model-driven applications, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

According to an embodiment of the present disclosure, by referring to FIG. 2A, the overall architecture of a changelog based data migration in the multi-layer model-driven applications may be referred. FIG. 2B depicts an overall architecture of one or more module drivers enabling a changelog executor 206, and thus facilitating the changelog based data migration in the multi-layer model-driven applications. Referring to FIG. 2C, the architecture of the changelog executor 206 facilitating the changelog based data migration in the multi-layer model-driven applications may be referred.

Herein, a Migrator Resource 201 comprises all requisites for a migration utility, like the drivers, changelogs, transformation functions etc., in a well formatted structure. An Installer 202 serves as an installation utility. Any migrator may be coupled with such an application installation utility, which may detect an already installed previous version of the application, and trigger the migration utility to transform a data into a new version data model specifications. A Migrator 203 is a migration utility comprising further components that facilitate the migration. A Post Processor 204 may be a part of the installer 202 that cleans up the environment set by the migration utility and any other application specific post-processes like updating the registries, validation of data etc.

A Global Driver 205 facilitates triggering of one or more module drivers. A Changelog Executor 206 executes a changelog for facilitating migration. A changelog 207 captures one or more conceptual model changes and transformations in data models. In-built transformations 208 comprise a collection of predefined functions, wherein the predefined functions facilitate transformation of data models. User-defined transformations 209 are defined by user(s) and are used to facilitate transformations of data models. External libraries 210 facilitate transformations in any of the changelogs. The implementation of the architectures illustrated via FIG. 2A through 2C along with the components described has been demonstrated and explained in the subsequent paragraphs.

FIG. 3, with reference to FIG. 1 through 2C, illustrates an exemplary flow diagram of a method of the data migration for the multi-layer model-driven applications, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301, the one or more hardware processors 104 perform a modelling of a model-driven application conceptual model comprising a plurality of conceptual model elements. Generally, a model driven architecture is a structure in which a business model, expressed in a modeling language drives the generation of the resulting software content. An integrated model-driven programming and execution environment can enable creation/development of an application model, and generation and execution of a data-centric application (i.e., a software program/system), such as an application, based on the specified application model.

In general, an application-model includes descriptions of one or more components of a data-centric software application, describing, for example, their structure, properties, relationships, and modes of presentation, including visual and user interfaces. Other kinds of features (e.g., web blocks, procedures, processes, logic flow, modules, and various user interface elements such as buttons, forms, fields, etc.) may also be described in an application model.

The modelling of model-driven application model(s) comprises transforming of the plurality of conceptual model elements from a first version to a second version by a modelling technique. As is known in the art, the semantics of connecting a plurality of conceptual model elements using other model elements comprises a key operation in the modelling and visualization. In general, a user creates model elements in a modeling environment to model the various concepts. Model elements are instantiated and assigned a type from one of possibly many available model element types.

Modelling is generally a technique used to represent physical system using a set of entities, their attributes and associations between them. The modelling may also be used to enhance existing conceptual models by modifying existing entities, introducing new entities, or establishing/changing associations between the entities.

In an embodiment, the first version comprises source design objects in a source design space, and the second version, obtained from the transformation comprises target design objects in a target design space. The result of the transformation is that at least one or more target design objects get associated with one or more source design objects. Considering an example scenario, in version N of a model driven application, a conceptual model entity "Employee" comprises attributes employee number, name, email id, phone number and date of joining.

Similarly, another entity Project included the attributes project no., project name and deadline. Also, the Project entity is associated to the Employee entity through a relationship named current project. However, in version N+1 of the application, the contact information of employee is separated into a new entity "Contact Info". A new entity "Contact Info" is to be created with the attributes email id, phone number, address, city, province and country, and the attributes email id and phone number are removed from the entity "Employee". Further the entity "Contact Info" would be associated to "Employee" through the employee number as the relationship.

According to an embodiment of the present disclosure, at step 302, the one or more hardware processors 104 generate, based upon the modelling, a plurality of optimized data models, wherein each of the plurality of optimized data models are generated by identifying entities, relationships between the entities and attributes from the model-driven application conceptual model. Generally, a data model refers to the logical inter-relationships and data flow between different data elements involved in the information world. It also documents the way data is stored and retrieved.

In an embodiment, each of the plurality of optimized data models are optimized or enhanced models in the sense that they do not comprise any previous version any of the plurality of conceptual model elements. Rather they comprise only enhanced version of each of the plurality of conceptual model elements as a result of the modelling performed in the step 301 above. Considering the same example scenario as discussed in step 301 above, as a result of the modelling from the version N, a data model could be created with each of the model element—employee, project etc., corresponding to a data model element. Assuming that the application uses a database to store the application data, the database would comprise tables, Employee and Project, with their respective attributes as columns.

The changes in the version N+1 would result in removal of fields "email id" and "phone number" in the data model and hence in a database table "employee" and a new data model shall be created and a table "contact info" created with the fields "contact id", "email id", "phone number", "address", "city", "province", "country" and "employee id (referencing employee id in the table employee).

According to an embodiment of the present disclosure, at step 303, the one or more hardware processors 104 extract at least one changelog 207 from each of the plurality of optimized data models. The changelog 207 is extracted by implementing a modelling enhancement technique on each of the plurality of model conceptual elements. In an embodiment, the changelog 207 captures the one or more conceptual model changes and transformations, in each of the plurality of optimized data models.

In an embodiment, model enhancement or the modelling enhancement technique proposed by the present disclosure is a process by which models may be enhanced to modify the existing entities, introduce new entities, or establish/change associations between the entities. This may be followed by generation of optimized data models and creation of changelogs by capturing the changes made to the conceptual model which correspond to the data models. The proposed disclosure thus facilitates a changelog based data migration execution for providing a systematic and continuous capturing of changes in each of the plurality of optimized data models. The process of extracting the changelog 207 from the plurality of optimized data models may now be considered in detail.

In an embodiment, the changelog 207 comprises a structured format for capturing the one or more conceptual model changes and transformations in each of the plurality of optimized data models. The extraction of the changelog 207 may be explained by considering the following example. Suppose, an organization ABC performs data migration for a multi-layer model-driven application. ABC stores most of its data in one or more databases, however certain data is persisted in files as well. ABC has released version 1.0 (say, build number 1b001), 1.5 (1b005), 2.0 (2r001), 3.0 (3r001) and 3.5 (3r007) of the multi-layer model-driven application and is in use with clients X Com (version 1.5, 1b005), Y Com (version 3.0, 3r001) and Z Com (version 3.5, 1r007). All the versions have differences in a database schema, and in one or more file formats.

Currently ABC is planning a release of version 4.0 (4r001). In the new release, there may be a significant changes in the database schema, and the company has now decided to move some data which used to be stored in files in previous versions, to the one or more databases. The new release has to be delivered to all the clients, without disrupting their respective user data. However, creation of separate migration utility at the time of release for each of the source versions in production includes (version 1.5 to 4.0), (version 3.0 to 4.0) and (version 3.5 to 4.0).

By implementing the proposed methodology, that is, a changelog based data migration, ABC may overcome major challenges faced by the traditional systems and methods. For example, during the development cycle of the version 1.5, all the modifications to optimized data models (and thus to the database schema) may be captured through a modelling tool systematically into a well formatted changelog 207, and custom programs may be written for the file format conversions. Once the release is frozen, the migration module may be tagged with the release identifier, in this case 1b005. The same process may be repeated for version 2.0 (2r001), version 3.0 (3r001) and version 3.5 (3r007).

For example, in a version 3.5, an entity "Employee" comprises fields employee number, name, email id, phone number, current project and date of joining. The other details of the employee like address, photograph etc. were stored in individual files. In version 4.0, the team would separate the contact information into a new entity "Contact Info". A new entity "Contact Info" is to be created with the fields email id, phone number, address, city, province and country, and email id and phone number removed from the entity "Employee". Further the entity "Contact Info" would reference "Employee" through the employee number as the reference.

Above change results in removal of fields "email id" and "phone number" in a database table "employee" and a new table "contact info" created with the fields "contact id", "email id", "phone number", "address", "city", "province", "country" and "employee id (referencing employee id in the table employee). Since the employee records are already saved, the information needs be seamlessly persisted to a new data structure.

By implementing the proposed methodology, whenever a change is made to a model element, the modification is systematically captured to a changelog or to a structured file format, say an XML file. Accordingly for the modification mentioned above, a new entry may be made in the changelog (that is, the XML file) for the new table "contact info" and would be mapped to "employee" table as the source. The columns "employee id", "email id", "phone number" are be mapped to the corresponding columns in the source table "employee". For the other columns "address", "city", "province" and "country", custom functions may be written to parse the relevant files and fetch the corresponding information and return the data, and would be specified as the source for the respective columns. Also, a driver program would be written to drive the migration.

Upon freezing of all the changes are frozen, the supported versions information are updated in a version log as "1b001", "1b005", "2r001", "3r001", 3r007", "4r001" and a complete system may be packaged as a single utility. Upon executing migration(s), the complete system would detect the source version as 1b005 and estimates the path to be taken till version 4r001, and incrementally applies the changes for all the builds in between, i.e. 2r001, 3r001, 3r007 and 4r001. Similarly for anyone executing the migration, the source is identified as 3r001 and 3r007 and the corresponding path is executed.

Thus, by implementing the proposed methodology, for the version N+1, the changelog 207 specifies that a new entity Contact Info is added (which corresponds to a data element contact info, in this case a database table), along with attributes email id, phone number, address city, province and country. Further transformations may be specified for each of the attributes as follows:

Email id source: email id @ Employee
Phone number source: phone number @ Employee
Address transformation function: fetch address from file
City transformation function: fetch city from file
Province transformation function: fetch province from file
Country transformation function: fetch country from file Referring to above details, it may be noted that for email id and phone number, which were already part of the data element stored in the database, a transformation with the source is specified. However, to extract data out of the address file, a transformation functions are defined and the functions shall act as transformation functions for the attributes address, city, province and country. Also note that the changelog 207 may not require any reference to the removed attributes from the Employee entity, since system shall create a schema for the version N+1 first and then move the data.

According to an embodiment of the present disclosure, at step 304, the one or more hardware processors 104 perform, based upon each of an extracted changelog 207, data migration in one or more multi-layer model-driven applications.

Initially, as a part of a general migration process, the one or more hardware processors 104 identify a plurality of versions between a source application version and a target application version for performing the data migration from a source system to a target system, wherein the source application version and the target application version correspond to the one or more multi-layer model-driven applications.

Considering an example scenario, suppose a client is running version N of any multi-layer model driven application and needs to migrate to another version N+3 (assuming that the same process is followed for N+2, and N+3). The one or more hardware processors 104 identify from an application, the source version as N. Hence, the source version is identified as N, as per the application installation registry, and the target version as N+3, as per the pre-defined target version specified for the migration utility.

In an embodiment, the one or more hardware processors 104 enable, by implementing the one or more module drivers, the changelog executor 206 for executing each of the extracted changelog 207, wherein the execution of each of the extracted changelog 207 comprises transforming a data from a first model specification to a second model specification, wherein the data corresponds to the model-driven application conceptual model, and wherein both the first model specification and the second model specification correspond to each of the plurality of optimized data models.

The one or more hardware processors 104 finally execute the data migration using each of an executing changelog 207, wherein the execution comprises an implementation of each modification in each of the plurality of conceptual model elements based upon the transformations in each of the plurality of optimized data models. Referring to FIG. 2A through 2C, the process of performing the changelog based data migration may be referred.

In an embodiment, referring to FIG. 2A, the architecture of the overall changelog based data migration process may be referred. Once a migration utility is invoked, the source version check is performed. If the source version can be migrated (that is, if the build number is found in the versions list maintained), the migration is executed. A target schema is created, the data to be migrated is transformed (by implementing any traditional techniques) according to the target specifications, and moved into the target environment for all versions listed till the target version. Once the iteration is complete, the final configurations are performed and the version information is updated.

Referring to FIG. 2B, the architecture of the one or more module drivers for enabling the changelog executor 206, and thus facilitating the changelog based data migration may be referred. Once the source environment is setup (as explained in the preceding paragraph), the migration is executed by a driver program. The global driver 205 triggers the one or more module drivers for each of the version between the source (n) and the target (n+T) and executes the migration workflow.

The one or more module drivers then creates the target environment for the particular version and executes the changelog executor 206, and the changelog executor 206 moves the transformed data into the version specific environment with the help of the changelog file and the transformation functions. Followed by the changelog executor 206, the global driver 205 may run custom programs which takes care of other data persistence elements or configurations Referring to FIG. 2C, the changelog executor 206 fetches a changelog (amongst each of the extracted changelog 207), and then reads one or more model elements from the fetched changelog. Further, each function within the scope of the one or more model elements is also fetched. Also, for the one or more model elements, a source is selected from another model element (amongst the plurality of conceptual model elements).

The one or more conceptual model changes in the fetched model element are iterated over by the changelog executor 206, and the corresponding transformation is applied on the respective attribute. The transformation may comprise a mapping to a source attribute, or a set of in-build transformations 208, or one of a user defined transformation (functions) 209. Thus, the step of executing the data migration is performed iteratively using each of the extracted changelog 207 for implementing each of the modification in each of the plurality of conceptual model elements. The one or more hardware processors 104 store the result of the transformation as a value for the corresponding attribute. For unmodified attributes with respect to the source, the value is automatically moved without any modification explicitly specified. The entire process is repeated for each of the extracted changelog 207.

Considering the same example scenario, the changelog executor 206 estimates the migration path to be N->N+1->N+2->N+3. Hence, the migration utility enables the drivers for the versions N+1, N+2, N+3 for execution. Also, the transformation functions for each of the corresponding changelogs shall be loaded for execution. The one or more module drivers for the version N+1 enable the changelog executor 206, which in-turn executes a changelog and for the one or more conceptual model changes, the corresponding transformation is applied. The data for the attributes such as email id and phone number of the contact info data element is then fetched from the corresponding data in employee data model for the version N. Similarly, the transformation functions for fetching the data from the files shall be executed to populate data for the attributes address, city, province and country.

In an embodiment, the step of identifying the plurality of versions comprises identifying a sequence of each of the plurality of versions for executing the data migration in a pre-defined sequence. Thus, the one or more hardware processors 104 maintain a separate a list of all the versions to be supported for the data migration in the sequential order. The list may further be used to identify the version of the source system and a sequence of versions through which the source data may be transformed in order to migrate the data from the source specifications to the target specifications.

Once the sequence is identified, the core components of the system may iteratively be invoked (as discussed in step 303 and 304) for all the released versions till the target version. This may finally be followed by a set of post-migration actions for configuring, validating and cleaning of production or other environments.

According to an embodiment of the present disclosure, some advantages of the proposed methodology may now be considered. Generally, data persistence methods are less volatile and changes less in its structure over consecutive releases, and thus data migration effort is minimal. However, for model-driven applications the model may be frequently evolving, and the migration cost high. Most of the traditional systems and methods provide for a comparison based approach to solve the database migration problems, which again results in high costs due to multiple backward compatibility requirements. The proposed methodology, by providing for the changelog based data migration, thus save efforts, time and cost of frequent migrations in the model-drivel application models.

More frequently, structure of a database is evolved (or altered) to match target specifications. The proposed methodology provides for creating the schema, and then the data is populated from the source database/other sources to a target schema. Further, data migration is usually performed at the end of a release cycle, by comparing the new specifications with the prior specifications and an evolution program is devised accordingly.

By implementing the proposed methodology, changes or transformations in data models are captured systematically and chronologically over the release cycle and the changelog is prepared. Finally, the traditional systems and methods focus mostly on data stored in databases. The proposed methodology, as shown via examples above, focusses on data stored in files as well.

In an embodiment, the memory 102 can be configured to store any data that is associated with data migration for multi-layer model-driven applications. In an embodiment, the information pertaining to the modelling, each of the plurality of optimized data models, the changelogs 207 extracted from each of the plurality of optimized data models, the data migration executed the data migration using each of the executing changelog 207 etc. is stored in the memory 102. Further, all information (inputs, outputs and so on) pertaining to data migration for multi-layer model-driven applications, may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method of data migration in multi-layer model-driven applications, the method comprising a processor implemented steps of:

modelling, by one or more hardware processors, a model-driven application conceptual model comprising a plurality of conceptual model elements, wherein the modelling comprises transforming of the plurality of conceptual model elements from a first version to a second version by a modelling technique; and wherein the model-driven application conceptual model corresponds to one or more multi-layer model-driven applications (301);

generating, based upon the modelling, a plurality of optimized data models corresponding to the one or more multi-layer model-driven applications, wherein each of the plurality of optimized data models are generated by identifying entities, relationships between the entities and attributes from the model-driven application conceptual model (302), wherein each of the plurality of optimized data models are optimized to comprise only an enhanced version of a previous version of each of the plurality of conceptual model elements;

extracting, from each of the plurality of optimized data models, at least one changelog capturing one or more conceptual model changes and transformations in each of the plurality of optimized data models, wherein the changelog is extracted by implementing a modelling enhancement technique on each of the plurality of conceptual model elements (303), wherein the modelling enhancement technique modify the entities, introduce new entities, change associations between the entities, in each of the plurality of optimized data models, and wherein the changes made to each of the plurality of optimized data models are systematically captured to the changelog or a structured file format; and performing, based upon each of an extracted changelog, data migration in the one or more multi-layer model-driven applications, wherein performing the data migration comprises (304):

identifying a plurality of versions between a source application version and a target application version for executing the data migration, wherein the source application version and the target application version correspond to the one or more multi-layer model-driven applications, and wherein a separate list for the plurality of versions are maintained in a sequential order and the list is used to identify the source application version and a sequence of versions through which a source data is transformed in order to migrate from source specifications to target specifications;

enabling, by one or more module drivers, a changelog executor for executing each of the extracted changelog, wherein the execution comprises transforming a data from a first model specification to a second model specification; and executing the data migration using each of an executing changelog, wherein the execution comprises an implementation of each modification in each of the plurality of conceptual model elements based upon the transformations in each of the plurality of optimized data models.

2. The method as claimed in claim 1, wherein the data corresponds to the model-driven application conceptual model, and wherein both the first model specification and the second model specification correspond to each of the plurality of optimized data models.

3. The method as claimed in claim 1, wherein the step of executing the data migration is performed iteratively using each of the extracted changelog for implementing each of the modification in each of the plurality of conceptual model elements.

4. The method as claimed in claim 1, wherein the step of identifying the plurality of versions comprises identifying a sequence of each of the plurality of versions for executing the data migration in a pre-defined sequence.

5. A system (100) of data migration in multi-layer model-driven applications, the system (100) comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

model a model-driven application conceptual model comprising a plurality of conceptual model elements, wherein the modelling comprises transforming of the plurality of conceptual model elements from a first version to a second version by a modelling technique; and wherein the model-driven application conceptual model corresponds to one or more multi-layer model-driven applications;

generate, based upon the modelling, a plurality of optimized data models corresponding to the one or more multi-layer model-driven applications, wherein each of the plurality of optimized data models are generated by identifying entities, relationships between the entities and attributes from the model-driven application conceptual model, wherein each of the plurality of optimized data models are optimized to comprise only an enhanced version of a previous version of each of the plurality of conceptual model elements;

extract, from each of the plurality of optimized data models, at least one changelog (207) capturing one or more conceptual model changes and transformations in each of the plurality of optimized data models, wherein the changelog (207) is extracted by implementing a modelling enhancement technique on each of the plurality of conceptual model elements, wherein the modelling enhancement technique modify the entities, introduce new entities, change associations between the entities, in each of the plurality of optimized data models, and wherein the changes made to each of the plurality of optimized data models are systematically captured to the changelog or a structured file format; and perform, based upon each of an extracted changelog (207), data migration in the one or more multi-layer model-driven applications, wherein performing the data migration comprises:

identify a plurality of versions between a source application version and a target application version for executing the data migration, wherein the source application version and the target application version correspond to the one or more multi-layer model-driven applications, and wherein a separate list for the plurality of versions are maintained in a sequential order and the list is used to identify the source application version and a sequence of versions through which a source data is transformed in order to migrate from source specifications to target specifications;

enable, via one or more module drivers, a changelog executor (206) for executing each of the extracted changelog (207), wherein the execution comprises transforming a data from a first model specification to a second model specification; and execute the data migration using each of an executing changelog (207), wherein the execution comprises an implementation of each modification in each of the plurality of conceptual model elements based upon the transformations in each of the plurality of optimized data models.

6. The system (100) as claimed in claim 5, wherein the data corresponds to the model-driven application conceptual model, and wherein both the first model specification and the second model specification correspond to each of the plurality of optimized data models.

7. The system (100) as claimed in claim 5, wherein the one or more hardware processors (104) are configured to execute the data migration iteratively using each of the extracted changelog (207) for implementing each of the modification in each of the plurality of conceptual model elements.

8. The system (100) as claimed in claim 5, wherein the one or more hardware processors (104) are configured to identify the plurality of versions by identifying a sequence of each of the plurality of versions for executing the data migration in a pre-defined sequence.

9. One or more non-transitory machine readable information storage mediums comprising one or more instructions which when executed by one or more hardware processors causes a method for:

modelling, a model-driven application conceptual model comprising a plurality of conceptual model elements, wherein the modelling comprises transforming of the plurality of conceptual model elements from a first version to a second version by a modelling technique; and wherein the model-driven application conceptual model corresponds to one or more multi-layer model-driven applications (301);

generating, based upon the modelling, a plurality of optimized data models corresponding to the one or more multi-layer model-driven applications, wherein each of the plurality of optimized data models are generated by identifying entities, relationships between the entities and attributes from the model-driven application conceptual model (302), wherein each of the plurality of optimized data models are optimized to comprise only an enhanced version of a previous version of each of the plurality of conceptual model elements;

extracting, from each of the plurality of optimized data models, at least one changelog capturing one or more conceptual model changes and transformations in each of the plurality of optimized data models, wherein the changelog is extracted by implementing a modelling enhancement technique on each of the plurality of conceptual model elements (303), wherein the modelling enhancement technique modify the entities, introduce new entities, change associations between the entities, in each of the plurality of optimized data models, and wherein the changes made to each of the plurality of optimized data models are systematically captured to the changelog or a structured file format; and performing, based upon each of an extracted changelog, data migration in the one or more multi-layer model-driven applications, wherein performing the data migration comprises (304):

identifying a plurality of versions between a source application version and a target application version for executing the data migration, wherein the source application version and the target application version correspond to the one or more multi-layer model-driven applications, and wherein a separate list for the plurality of versions are maintained in a sequential order and the list is used to identify the source application version and a sequence of versions through which a source data is transformed in order to migrate from source specifications to target specifications;

enabling, by one or more module drivers, a changelog executor for executing each of the extracted changelog, wherein the execution comprises transforming a data from a first model specification to a second model specification; and executing the data migration using each of an executing changelog, wherein the execution comprises an implementation of each modification in each of the plurality of conceptual model elements based upon the transformations in each of the plurality of optimized data models.

10. The one or more non-transitory machine readable information storage mediums of claim 9, wherein the data corresponds to the model-driven application conceptual model, and wherein both the first model specification and the second model specification correspond to each of the plurality of optimized data models.

11. The one or more non-transitory machine readable information storage mediums of claim 9, wherein the step of executing the data migration is performed iteratively using each of the extracted changelog for implementing each of the modification in each of the plurality of conceptual model elements.

12. The one or more non-transitory machine readable information storage mediums of claim 9, wherein the step of identifying the plurality of versions comprises identifying a sequence of each of the plurality of versions for executing the data migration in a pre-defined sequence.

* * * * *